US012754532B2

(12) United States Patent
Nakagawa et al.

(10) Patent No.: US 12,754,532 B2
(45) Date of Patent: Oct. 6, 2026

(54) METHOD FOR MANAGING ELECTRONIC COMPONENTS

(71) Applicant: Murata Manufacturing Co., Ltd., Nagaokakyo (JP)

(72) Inventors: Kiyoyuki Nakagawa, Nagaokakyo (JP); Yasuhiro Shimizu, Nagaokakyo (JP); Koichi Iwamoto, Nagaokakyo (JP); Nobuto Yamada, Nagaokakyo (JP); Naoto Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 363 days.

(21) Appl. No.: 18/506,183

(22) Filed: Nov. 10, 2023

(65) Prior Publication Data

US 2024/0077851 A1 Mar. 7, 2024

Related U.S. Application Data

(63) Continuation of application No. PCT/JP2022/012295, filed on Mar. 17, 2022.

(30) Foreign Application Priority Data

May 18, 2021 (JP) ................................ 2021-083809

(51) Int. Cl.
*G05B 19/418* (2006.01)
*G06Q 10/08* (2024.01)

(52) U.S. Cl.
CPC ... *G05B 19/4183* (2013.01); *G05B 19/41865* (2013.01); *G06Q 10/08* (2013.01);
(Continued)

(58) Field of Classification Search
CPC .......... G06K 19/00; G06K 7/00; G05B 19/00; G05B 19/048; G06Q 10/0833; G06Q 10/087; H05K 13/04; H05K 13/0812
(Continued)

(56) References Cited

U.S. PATENT DOCUMENTS 6,027,019 A * 2/2000 Kou .................... H05K 13/087 29/709
2003/0102367 A1 * 6/2003 Monette ........... G05B 19/41865 235/376
(Continued)

FOREIGN PATENT DOCUMENTS

CN 101523430 A 9/2009
JP 2002358494 A 12/2002
(Continued)

OTHER PUBLICATIONS

International Search Report in PCT/JP2022/012295, mailed Jun. 21, 2022, 3 pages.
(Continued)

*Primary Examiner* — Ronald D Hartman, Jr.
(74) *Attorney, Agent, or Firm* — Keating & Bennett, LLP

(57) ABSTRACT

A method for managing electronic components includes a manufacturer-side process including preparing bulk cases provided with RFID tags storing unique IDs and including electronic components stored therein, storing manufacturer-side information in association with the unique IDs in a manufacturer-side-information storage area on a cloud, and shipping the electronic components on a per-bulk case basis, receiving the shipped bulk cases, reading the unique IDs stored in the RFID tags, and obtaining, based on the read unique IDs, the manufacturer-side information stored in the manufacturer-side-information storage area in the cloud.

18 Claims, 18 Drawing Sheets

(52) U.S. Cl.
CPC .............. *G05B 2219/31428* (2013.01); *G05B 2219/45029* (2013.01)

(58) Field of Classification Search
USPC .......................................................... 700/116
See application file for complete search history.

(56) References Cited

U.S. PATENT DOCUMENTS

| | | | | |
|---|---|---|---|---|
| 2005/0004702 | A1* | 1/2005 | McDonald | G07B 17/00024 340/8.1 |
| 2005/0178811 | A1* | 8/2005 | Rodgers | H05K 13/0417 226/1 |
| 2006/0145817 | A1* | 7/2006 | Aikawa | G06K 7/0008 340/10.52 |
| 2008/0088454 | A1* | 4/2008 | Flores | G07G 1/009 340/572.4 |
| 2008/0277469 | A1* | 11/2008 | Corriveau | G05B 19/4183 235/385 |
| 2009/0114714 | A1* | 5/2009 | Huang | G06Q 10/08 235/376 |
| 2009/0177560 | A1 | 7/2009 | Ishizuka | |
| 2010/0200159 | A1* | 8/2010 | Le | B65C 1/021 156/362 |
| 2011/0068924 | A1* | 3/2011 | Muirhead | B29C 51/46 340/572.1 |
| 2012/0306666 | A1 | 12/2012 | Xu et al. | |

FOREIGN PATENT DOCUMENTS

| | | | |
|---|---|---|---|
| JP | 2005324839 | A | 11/2005 |
| JP | 2006027773 | A | 2/2006 |
| JP | 2006103929 | A | 4/2006 |
| JP | 2006293532 | A | 10/2006 |
| JP | 2007106557 | A | 4/2007 |
| JP | 2015503129 | A | 1/2015 |
| JP | 2017036123 | A | 2/2017 |
| KR | 20180015879 | A | 2/2018 |

OTHER PUBLICATIONS

Written Opinion in PCT/JP2022/012295, mailed Jun. 21, 2022, 5 pages.
Official Communication issued in corresponding Chinese Patent Application No. 202280029623.4, mailed on Mar. 31, 2026, 8 pages.

* cited by examiner

METHOD FOR MANAGING ELECTRONIC COMPONENTS

CROSS REFERENCE TO RELATED APPLICATIONS

This application claims the benefit of priority to Japanese Patent Application No. 2021-083809 filed on May 18, 2021 and is a Continuation Application of PCT Application No. PCT/JP2022/012295 filed on Mar. 17, 2022. The entire contents of each application are hereby incorporated herein by reference.

BACKGROUND OF THE INVENTION

1. Field of the Invention

The present invention relates to a method for managing an electronic component.

2. Description of the Related Art

Conventionally, in component manufacturers which manufacture small-sized electronic components such as semiconductor chips and capacitor chips, a plurality of manufactured electronic components are stored in a single storage body, transported and stored in a factory, and shipped to manufacturers of assembled products in the form of the storage body.

As the configuration of the storage body, there are known configurations in which a carrier tape in which electronic components are divided and held one by one is wound around a reel, a magazine in which electronic components are aligned and stored, a bulk case in which electronic components are stored in a loose state, that is, in a bulk state, and a bagging method (for example, see Japanese Unexamined Patent Application, Publication No. 2005-324839).

On the other hand, in order to perform manufacturing management of an article, a technology is known using a wireless tag system in which an RFID tag is attached to an individual piece to be managed and ID information preset in the RFID tag is read (for example, see Japanese Unexamined Patent Application, Publication No. 2002-358494).

As the size of an electronic component is significantly reduced, it is considered that such a storage body is managed in order to manage a large amount of electronic components.

However, Japanese Unexamined Patent Application, Publication No. 2005-324839 and Japanese Unexamined Patent Application, Publication No. 2002-358494 do not refer to the point that such a storage body is managed in various forms, and therefore, there is room for improvement.

SUMMARY OF THE INVENTION

Preferred embodiments of the present invention provide methods for managing electronic components which are each able to achieve various management types of a storage body in which a plurality of electronic components are stored, on a manufacturer side of the electronic components and on a user side of the electronic components.

A method for managing electronic components according to a preferred embodiment of the present invention includes a manufacturer-side process performed in a manufacturer-side facility where a manufacturer manufactures the electronic components, and a user-side process performed in a user-side facility where a user uses the electronic components manufactured in the manufacturer-side facility. The manufacturer-side process includes preparing a storage body that stores a plurality of electronic components and includes an RFID tag including a unique number stored therein, storing manufacturer-side information in association with the unique number in a manufacturer-side information storage area in an external storage device, and shipping the storage body in which the plurality of electronic components are stored. The user-side process includes receiving the shipped storage body, reading the unique number stored in the RFID tag, and obtaining the manufacturer-side information stored in the manufacturer-side information storage area of the external storage device based on the unique number read.

A method for managing electronic components according to a preferred embodiment of the present invention includes a manufacturer-side process performed in a manufacturer-side facility where a manufacturer manufactures the electronic components, and a user-side process performed in a user-side facility where a user uses the electronic components manufactured in the manufacturer-side facility. The manufacturer-side process includes preparing a storage body that stores a plurality of electronic components and includes an RFID tag, preparing a unique number associated with manufacturer-side information, storing the manufacturer-side information in association with the unique number in a manufacturer-side information storage area in an external storage device, writing the unique number in the RFID tag, and shipping the storage body in which the plurality of electronic components are stored. The user-side process includes receiving the shipped storage body, reading the unique number stored in the RFID tag, and obtaining the manufacturer-side information stored in the manufacturer-side information storage area of the external storage device based on the unique number read.

According to preferred embodiments of the present invention, it is possible to provide methods for managing electronic components which are each able to achieve various management types of a storage body in which a plurality of electronic components are stored, on the manufacturer side of the electronic components and on the user side of the electronic components.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
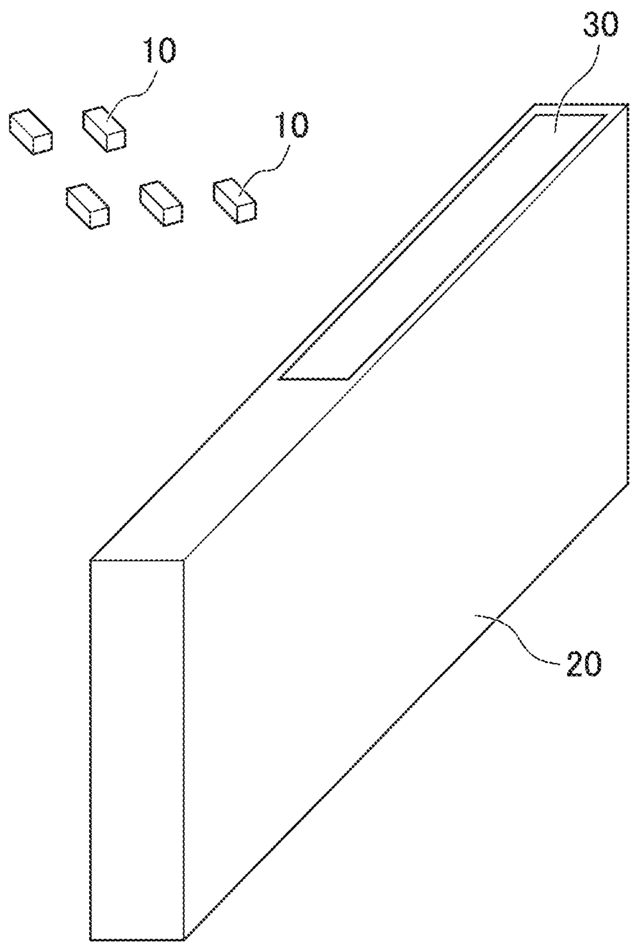
FIG. 1 is a schematic perspective view of electronic components and a bulk case according to a preferred embodiment of the present invention.

FIG. 1 shows a bulk case 20 defining and functioning as a storage body and electronic components 10 stored in the bulk case 20 according to a preferred embodiment of the present invention.

Figure 2:
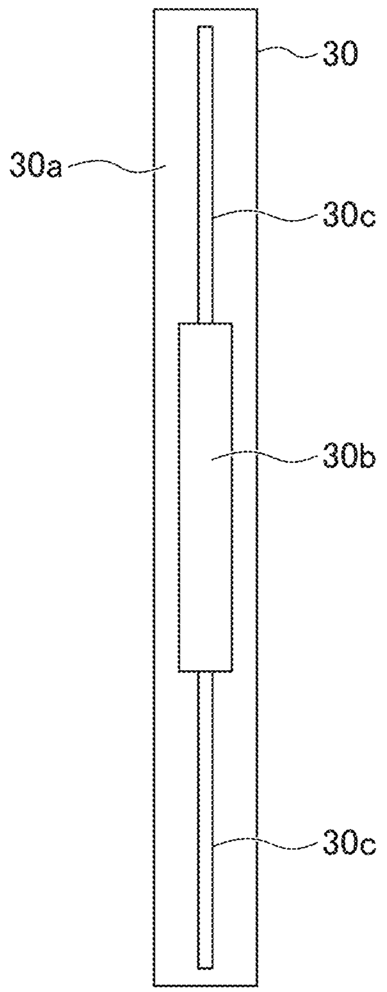
FIG. 2 is a plan view of an RFID tag according to a preferred embodiment of the present invention.

FIG. 2 shows an example of a configuration of a RFID tag 30 included in the bulk case 20.

Figure 3A:
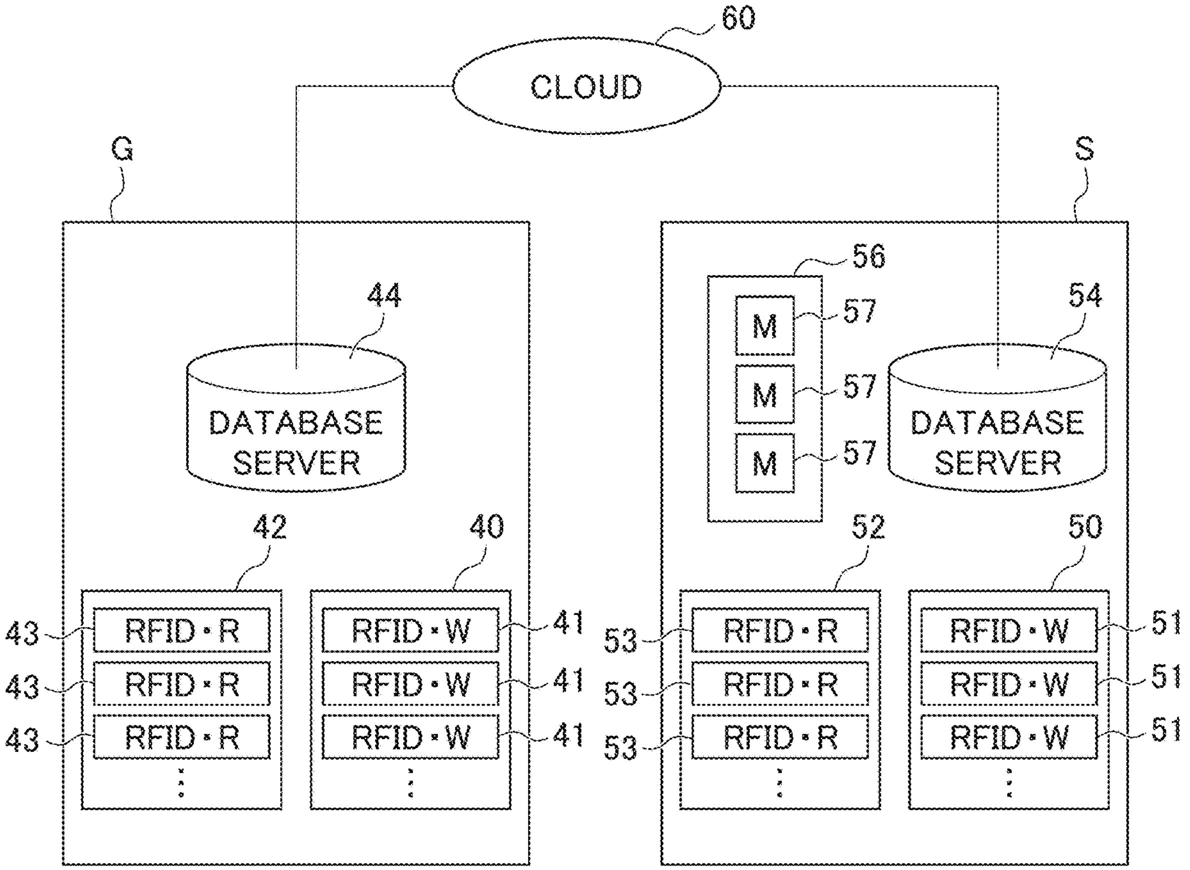
FIG. 3A is a block diagram of a hardware configuration for managing electronic components respectively provided in a component manufacturer and a manufacturer of assembled products according to a preferred embodiment of the present invention.

FIG. 3A shows a hardware configuration for managing the electronic components 10 provided in each of a component manufacturer G manufacturing the electronic components 10 and a manufacturer of assembled products S using the electronic components 10.

The component manufacturer G is an example of a manufacturer-side facility for manufacturing the electronic components 10.

The manufacturer of assembled products S is an example of a user-side facility using the electronic components 10.

As shown in FIG. 1, the bulk case 20 is, for example, a rigid box body made of resin and having a thin rectangular or substantially rectangular parallelepiped shape.

The bulk case 20 stores, for example, several thousands to several tens of thousands of electronic components 10 in a loose state, i.e., in a bulk state.

The bulk case 20 includes the RFID tag 30.

The RFID tag 30 is attached to one end surface of the bulk case 20 or stored in the bulk case 20.

The electronic components 10 according to the present preferred embodiment are, for example, capacitors, inductors, resistors, or the like, and each of them is, for example, a small rectangular or substantially rectangular parallelepiped electronic component having a longitudinal length of about 1.2 mm or less.

As shown in FIG. 2, the RFID tag 30 is a passive transponder including a rectangular or substantially rectangular sheet 30*a* made of, for example, resin defining and functioning as a base material, an RFID chip 30*b* including a semiconductor integrated circuit, and a plurality of antennas 30*c* to communicate with an external device.

The RFID chip 30*b* and the antenna 30*c* are attached to the sheet 30*a*.

The RFID tag 30 may be, for example, of a type in which the RFID chip 30*b* and the antenna 30*c* are embedded in the sheet 30*a*.

Alternatively, a power source unit may be provided.

The RFID chip 30*b* includes a CPU, memory, a communication circuit, and the like.

The RFID tag 30 may be, for example, of a type in which memory cannot be rewritten (RO: Read Only), a type in which memory can be rewritten once (WORM: Write Once Read Many), or a type in which memory can be rewritten (R/W: Read and Write).

For example, in a case where the type of the RFID tag 30 is RO or WORM, the cost is low although information to be written is smaller than that of R/W.

Figure 4:
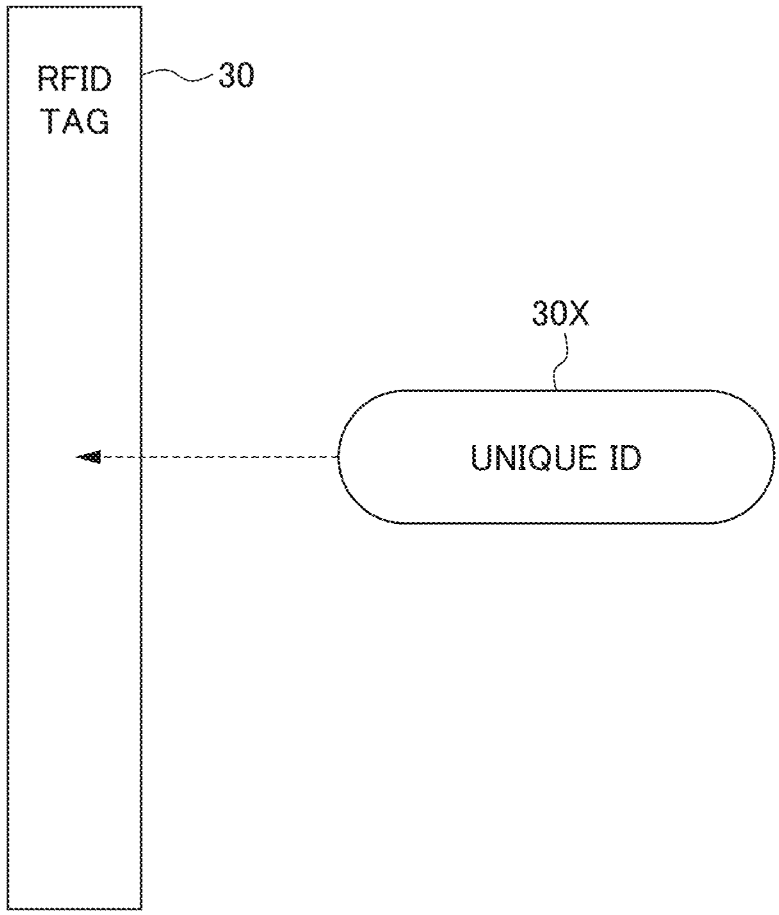
FIG. 4 is a diagram of an image of writing a unique ID to an RFID tag included in a bulk case according to a preferred embodiment of the present invention.

As shown in FIG. 4, a unique ID 30X defining and functioning as a unique number to identify the bulk case 20 is written in the RFID tag 30.

The unique ID 30X is written in the RFID chip 30*b*.

In addition, the unique ID 30X includes a plurality of character strings such as, for example, numerals, symbols, alphabets, etc., and is different for each RFID tag 30. However, a unique ID different for each of the RFID tags 30 is collectively referred to as a unique ID 30X in this specification.

When the RFID tag 30 is RO, the RFID tag 30 in which the unique ID 30X is previously written and stored is attached to the bulk case 20.

When the RFID tag 30 is WORM or R/W, the unique ID 30X is written and stored in the RFID tag 30 by a writer unit 40.

The unique ID 30X may be written into the RFID tag 30 before the RFID tag 30 is attached to the bulk case 20, or may be written into the RFID tag 30 after the RFID tag 30 is attached to the bulk case 20.

As shown in FIG. 3A, the component manufacturer G includes the writer 40 capable of writing the unique ID 30X associated with manufacturer-side information, which is information on the component manufacturer G side, to the RFID tag 30 provided in the bulk case 20, a reader 42 to read the unique ID 30X associated with manufacturer-side information recorded in the RFID tag 30 provided in the bulk case 20, and a database server 44.

The writer 40 and the reader 42 may be integrated with each other.

The database server 44 is prepared on the component manufacturer G side.

The writer 40 writes the unique ID 30X and the manufacturer-side information into the RFID tag 30.

In the database server 44, the unique ID 30X and the manufacturer-side information are mutually associated and stored.

The reader 42 reads the unique ID 30X written in the RFID tag 30.

When the component manufacturer G uses the reader 42 to read the unique ID 30X, the component manufacturer G accesses the database server 44, and can read the manufacturer-side information stored in the database server 44 in association with the unique ID 30X.

The database server 44 on the component manufacturer G side can be connected to a cloud 60 on the Internet together with a database server 54 on the manufacturer of assembled products S side described later.

The cloud is an abbreviation for cloud computing.

Cloud computing is a generic term for services that enable use of various resources such as software, hardware, database, and storage area via a communication line such as the Internet, for example.

In the present preferred embodiment, the cloud 60 is an example of an external storage device, and more specifically, a storage area in cloud computing is an example of an external storage device.

The external storage device may not necessarily be a storage area in cloud computing, and may be any storage device which can be accessed by the component manufacturer G and the manufacturer of assembled products S via a communication line.

The database server 44 and the database server 54 may be provided in the cloud 60.

Figure 3B:
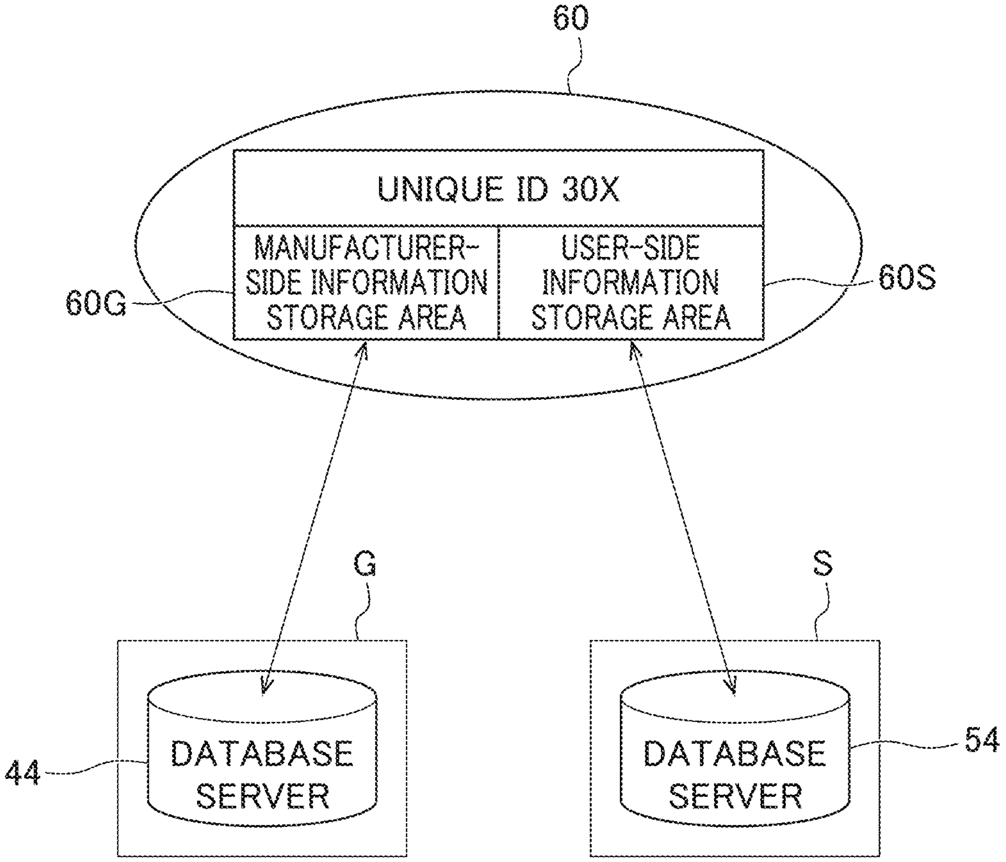
FIG. 3B is a schematic diagram of a configuration in a cloud according to a preferred embodiment of the present invention.

As shown in FIG. 3B, the cloud 60 includes a manufacturer-side information storage area 60G to store manufacturer-side information, and a user-side information storage area 60S to store user-side information on a manufacturer of assembled products S side described later.

A portion or all of the unique ID 30X and the manufacturer-side information stored in the database server 44 on the component manufacturer G side are copied and stored in the cloud 60.

A portion or all of the unique ID 30X and the user-side information stored in the database server 54 of the manufacturer of assembled products S is copied and stored in the cloud 60.

By accessing the cloud 60, both of the component manufacturer G and the manufacturer of assembled products S can share both pieces of information associated with the unique ID 30X.

The writer 40 includes a plurality of RFID writers 41 capable of writing information in a non-contact manner.

Each of the plurality of RFID writers 41 is provided at a predetermined position in a factory of the component manufacturer G.

The RFID writer 41 copies and stores a portion or all of the unique ID 30X and the manufacturer-side information read from the database server 44 in the manufacturer-side information storage area 60G of the cloud 60.

The reader 42 includes a plurality of RFID readers 43 capable of reading the unique ID 30X associated with the manufacturer-side information in a non-contact manner.

Each of the plurality of RFID readers 43 is provided at a predetermined position in a factory of the component manufacturer G.

The read information of the RFID reader 43 is stored in the database server 44 and the manufacturer-side information storage area 60G of the cloud 60.

The manufacturer of assembled products S includes a writer 50 capable of writing the unique ID 30X associated with user-side information, which is information on the manufacturer of assembled products S side, to the RFID tag 30 provided in the bulk case 20, a reader 52 to read the unique ID 30X recorded in the RFID tag 30 provided in the bulk case 20, a database server 54, and a mounter 56.

The mounter 56 is an example of a mounting device.

When the type of the RFID tag 30 is WORM or R/W, the writer 50 may be omitted.

The writer 50 writes the unique ID 30X and the user side information into the database server 54.

In the database server 54, the unique ID 30X and the user side information are mutually associated and stored.

The reader 52 reads the unique ID 30X written in the RFID tag 30.

When the reader 52 reads the unique ID 30X, the reader 52 accesses the database server 54 to read the user-side information stored in the database server 54 in association with the unique ID 30X.

The writer 50 includes a plurality of RFID writers 51 capable of writing information in a non-contact manner.

Each of the plurality of RFID writers 51 is provided at a predetermined position in a factory of the manufacturer of assembled products S.

The RFID writer 51 may write and record the unique ID 30X associated with the user-side information and the manufacturer-side information in the RFID tag 30.

The reader 52 includes a plurality of RFID readers 53 capable of reading the unique ID 30X in a non-contact manner.

The reader 52 is an example of a first reader.

Each of the plurality of RFID readers 53 is provided at a predetermined position in a factory of the manufacturer of assembled products S.

The read information of the RFID reader 53 is stored in the database server 54 and the user-side information storage area 60S of the cloud 60.

In the component manufacturer G, the reader 42 can read a portion or all of the user information (for example, the number of electronic components 10 to be used) stored in the user-side information storage area 60S of the cloud 60 in association with the unique ID 30X.

Further, in the manufacturer of assembled products S, the reader 52 can read a portion or all of the manufacturer information (for example, the number of electronic components 10 to be produced) stored in the manufacturer-side information storage area 60G of the cloud 60 in association with the unique ID 30X.

The mounter 56 is a device to mount at least one electronic component 10 on an electronic circuit board included in an electronic device set.

The mounter 56 includes a plurality of component supply devices 57.

The bulk case 20 is set in each component supply device 57, and the electronic components 10 in the bulk case 20 is supplied to the mounter 56.

Figure 5:
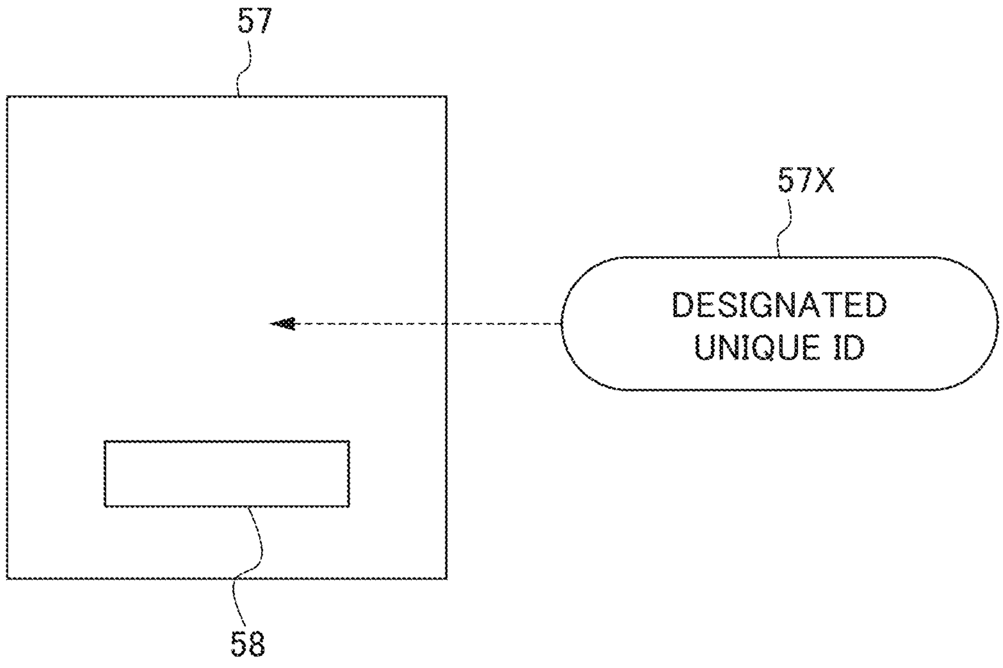
FIG. 5 is a block diagram of a configuration of a component supply device included in a mounter defining and functioning as a mounting device according to a preferred embodiment of the present invention, and shows an image in which a designated unique ID is written in the component supply device.

As shown in FIG. 5, a designated unique ID 57X is electronically written and stored in each component supply device 57 of the mounter 56.

Each component supply device 57 of the mounter 56 includes an RFID reader 58 that reads the RFID tag 30 included in the bulk case 20.

The designated unique ID 57X is an example of a designated unique number.

The RFID reader 58 is an example of a second reader.

The component manufacturer G stores a plurality of electronic components 10 manufactured in the factory in the bulk case 20, conveys and stores them, and ships them to the manufacturer of assembled products S.

The manufacturer of assembled products S receives a plurality of bulk cases 20 and mounts the electronic components 10 stored in the bulk case 20 on an electronic circuit board included in the electronic device set by the mounter 56.

The manufacturer of assembled products S manufactures an electronic circuit board or the like.

Figure 6:
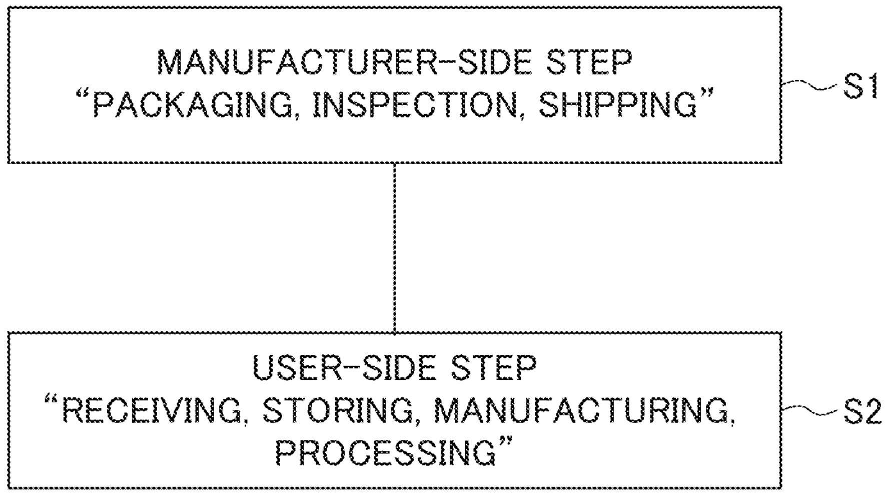
FIG. 6 is a flowchart of an outline of a management method of electronic components according to a preferred embodiment of the present invention.

As shown in FIG. 6, in the component manufacturer G, the manufacturer-side step S1 is performed.

The manufacturer-side step S1 in the component manufacturer G includes a packaging process of the electronic components 10, an inspection process, and a shipping process.

Further, in the manufacturer of assembled products S, the user-side step S2 is performed.

The user-side step S2 in the manufacturer of assembled products S includes a receiving process, a storage process, a manufacturing process, and a processing process of the electronic components 10.

In the component manufacturer G, a plurality of manufactured electronic components 10 are stored in the bulk case 20, and a plurality of bulk cases 20 are shipped from the component manufacturer G.

The plurality of bulk cases 20 shipped from the component manufacturer G are received by the manufacturer of assembled products S and used.

The flows of the electronic components 10 in the component manufacturer G and the manufacturer of assembled products S will now be described with reference to FIGS. 7 and 8.

Manufacturer-Side Steps in Component Manufacturer G

Figure 7:
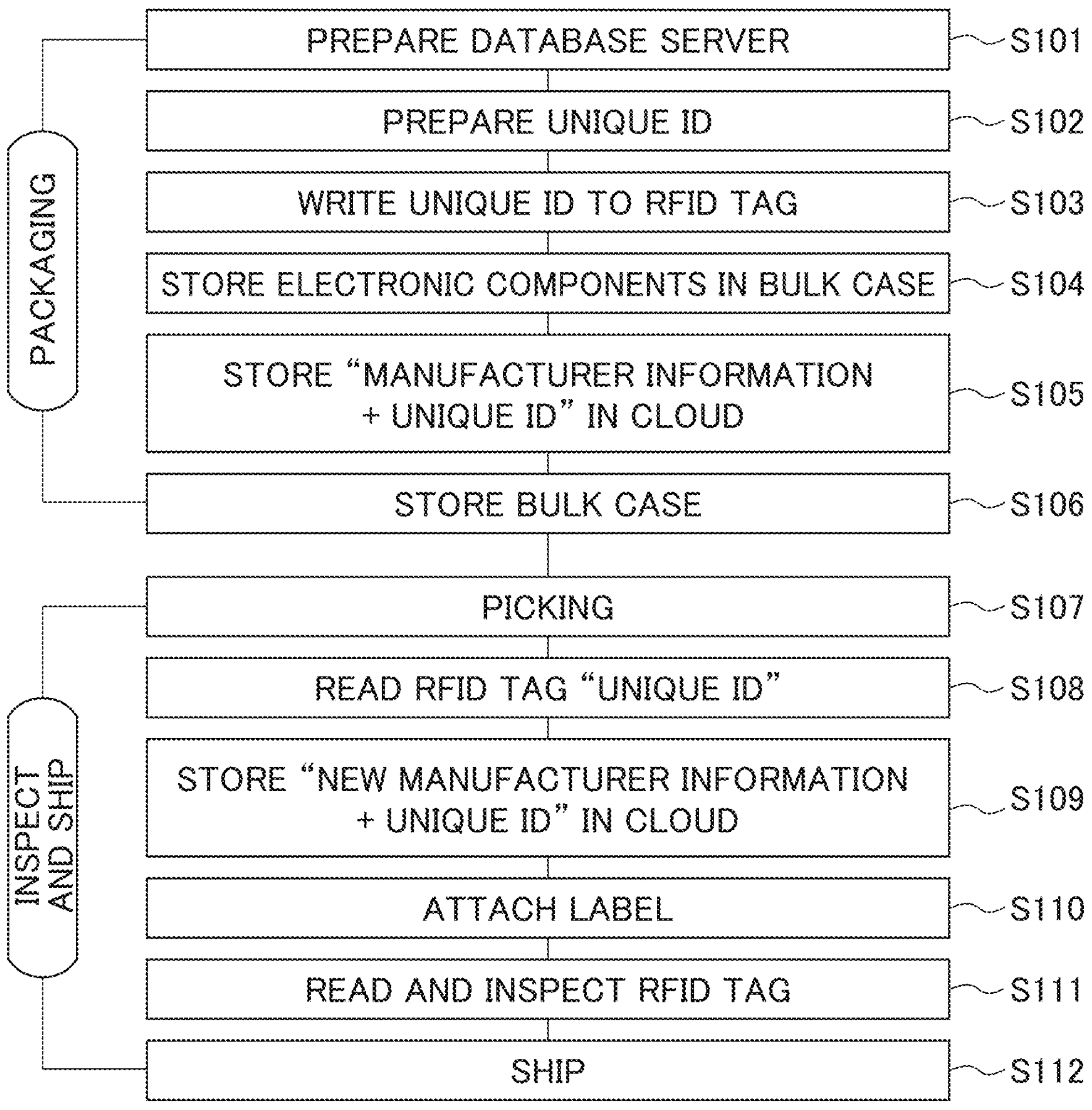
FIG. 7 is a flowchart of a method for managing electronic components according to a preferred embodiment of the present invention, and shows details of the manufacturer's steps on the component manufacturer side.

FIG. 7 shows the details of the manufacturer-side step S1 which is the flow of the electronic components 10 on the manufacturer of assembled products S side.

In the component manufacturer G, the database server 44 storing manufacturer-side information described later is prepared in advance (step S101).

Further, in the component manufacturer G, the unique ID 30X to identify the bulk case 20 is prepared for each bulk case 20 (step S102).

Packaging Process

In the packaging process, when the RFID tag 30 is WORM or R/W, the prepared unique ID 30X is written to the RFID tag 30 before or after the RFID tag 30 is attached to the bulk case 20 (step S103).

Next, the plurality of manufactured electronic components 10 are stored in the bulk case 20 (step S104).

With such a configuration, the bulk case 20 storing the plurality of electronic components 10 and including the RFID tag 30 including the unique ID 30X is prepared.

When the RFID tag 30 attached to the bulk case 20 is RO, the unique ID 30X is stored in advance in the RFID tag 30.

In this case, step S103 is omitted, and a plurality of electronic components 10 are stored in the bulk case 20.

In the packaging process, the manufacturer-side information is stored in the database server 44 in association with the unique ID 30X held by the RFID tag 30 attached to the bulk case 20, and is stored in the manufacturer-side information storage area 60G of the cloud 60 (step S105).

The manufacturer-side information is a plurality of pieces of information set or held by the component manufacturer G side regarding the electronic components 10 stored in the bulk case 20.

Examples of the manufacturer-side information include the lot number of the electronic components 10, the number of the electronic components 10 to be stored in the bulk case 20, product information such as performance of the electronic components 10, environmental information of the electronic components 10, and the inspection number of the electronic components 10.

Depending on the type of the electronic components 10, for example, MSL (Moisture Sensitivity Level) is recorded.

The MSL is a level indicating a risk for a phenomenon in which volume expansion due to vaporization of moisture in the electronic components 10 occurs to cause a failure.

It is also possible to obtain information on the manufacturing process of the electronic components 10 via the lot number.

In this case, the unique ID 30X is used as a key, or information is acquired by using a key stored in the RFID tag 30 together with the unique ID 30X.

In the factory of the component manufacturer G, the RFID tag 30 of the bulk case 20 is read by a predetermined RFID reader 43, and the manufacturer side information associated with the unique ID 30X is read, such that the bulk case 20 is managed.

Figure 9:
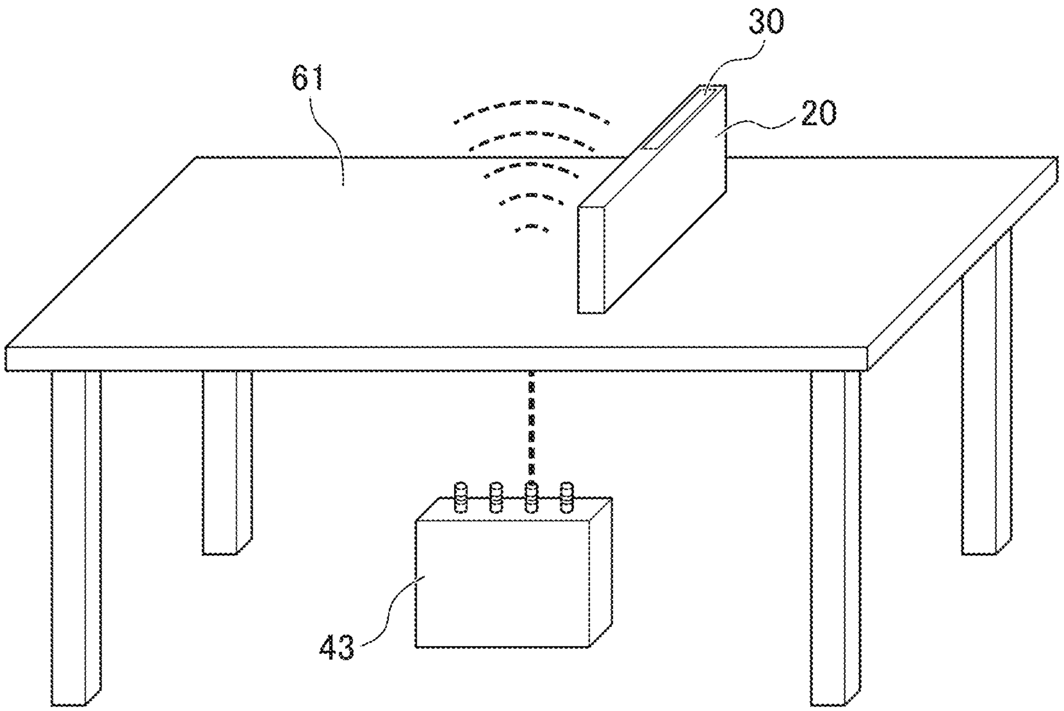
FIG. 9 is a perspective view of an example of a method of reading information of an RFID tag of a bulk case in the component manufacturer.

In order to read the unique ID 30X of the RFID tag 30, for example, as shown in FIG. 9, the unique ID 30X of the RFID tag 30 of the bulk case 20 placed on a table 61 is read by the RFID reader 43 placed on the table 61.

The plurality of bulk cases 20 from which the unique ID 30X of the RFID tag 30 is read are transported in the factory and stored in a predetermined storage location (step S106).

Then, during the next inspection/processing process, based on the unique ID 30X stored in the RFID tag 30, for example, inventory information management in the factory, location management based on a travel route, security management, and the like are performed.

Inventory information management, location management, and security management are performed based on the reading information of the RFID reader 43 provided in the factory.

The RFID reader 43 is provided at, for example, a gate provided in a passage, an entrance/exit port to the room, or the like, and reads the unique ID 30X recorded in the RFID tag 30 when the bulk case 20 passes through the RFID reader 43.

The inventory information management performs inventory management by checking whether or not the bulk case 20 is stored in a predetermined storage location.

For example, when the RFID tag 30 passes through a gate provided at an entrance/exit port to a predetermined storage location, the unique ID 30X of the RFID tag 30 is read by the RFID reader 43 provided at the gate, thus confirming that the RFID tag 30 is in inventory.

The location management is a management in which the locational position of the bulk case 20 in the factory is grasped one by one by allowing the bulk case 20 transported in the factory to pass through a plurality of gates or enter and exit a predetermined room.

Since the RFID tag 30 cannot be detected by the RFID reader 43 or the like when the RFID tag 30 is stored in a metal case, the locational position of the RFID tag 30 can be grasped more accurately by using a metal detector or an X-ray inspection apparatus in combination.

In the security management, for example, when one bulk case 20 is out of the factory in a state in which shipping is not confirmed by, for example, the RFID tag 30, it is determined that the bulk case 20 is not shipped on a regular route, and a warning is issued.

Inspection/Shipment Process

In the inspection/shipment process, the bulk case 20 is picked from the storage location (step S107), and then the unique ID 30X stored in the RFID tag 30 attached to the picked bulk case 20 is read (step S108).

Figure 10:
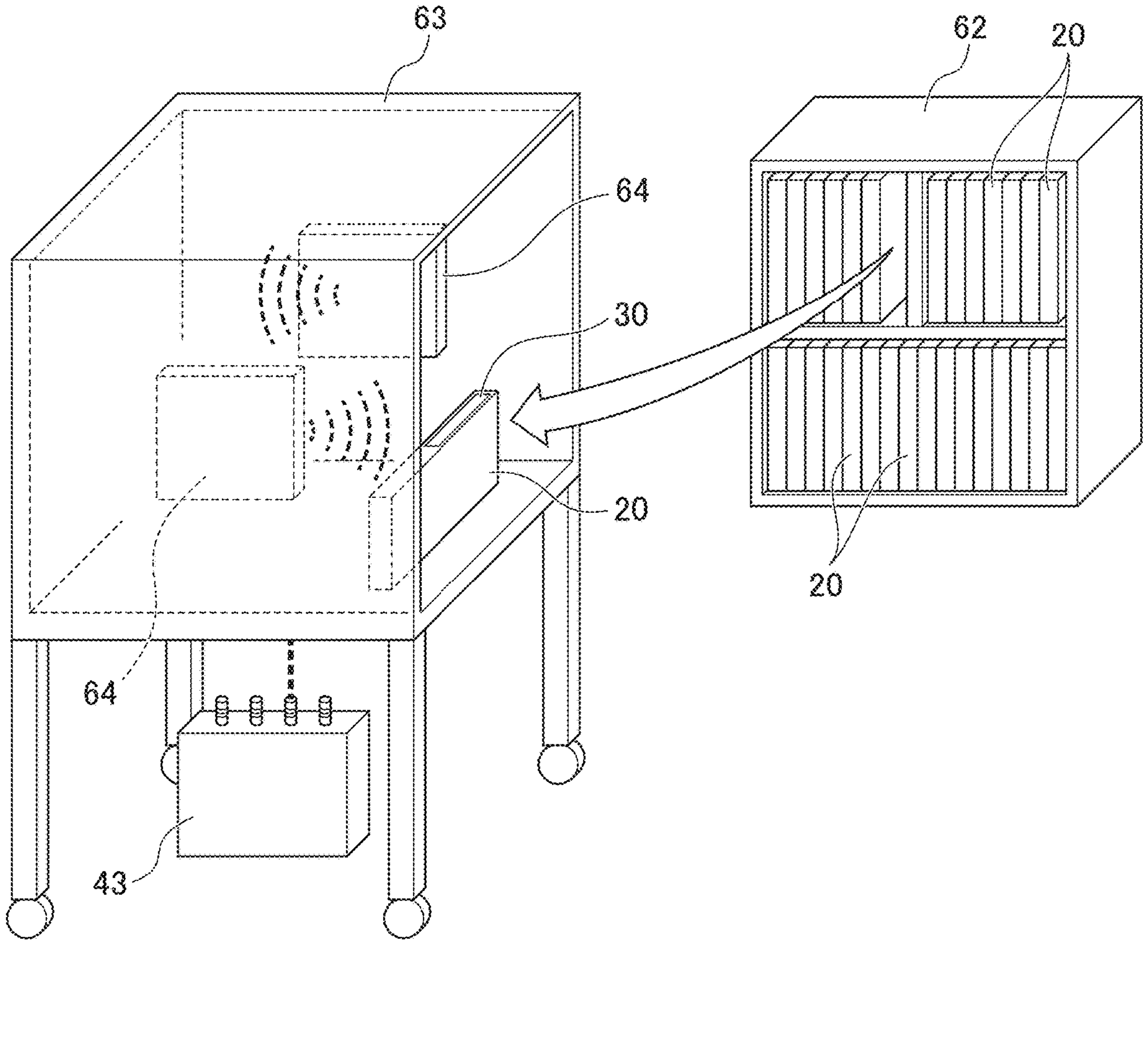
FIG. 10 is a perspective view of an example of a method of reading information of an RFID tag of a bulk case picked from a storage location in the component manufacturer.

For example, as shown in FIG. 10, the bulk case 20 is picked up from a storage location 62 such as a storage shelf and placed on a cart 63 for transportation, and on the cart 63, the unique ID 30X of the RFID tag 30 is read by the RFID reader 43 via a sensor 64.

The RFID reader 43 is installed at an appropriate position of the cart 63.

Thus, information indicating that the bulk case 20 is shipped is inputted to the database server 44.

When the bulk case 20 is away from the readable distance of the RFID reader 43, the unique ID 30X recorded in the RFID tag 30 may be read through the sensor 64 close to the bulk case 20.

Here, in the manufacturer-side information storage area 60G of the cloud 60, new manufacturer-side information is further stored via the database server 44 in association with the unique ID 30X included in the RFID tag 30 of the picked bulk case 20 (step S109).

The new manufacturer-side information here includes, but is not limited to, for example, a part number used by the manufacturer of assembled products S, an order number from the manufacturer of assembled products S, a factory number of the component manufacturer G, a date related to manufacturing, a vendor number, and the like.

Figure 11:
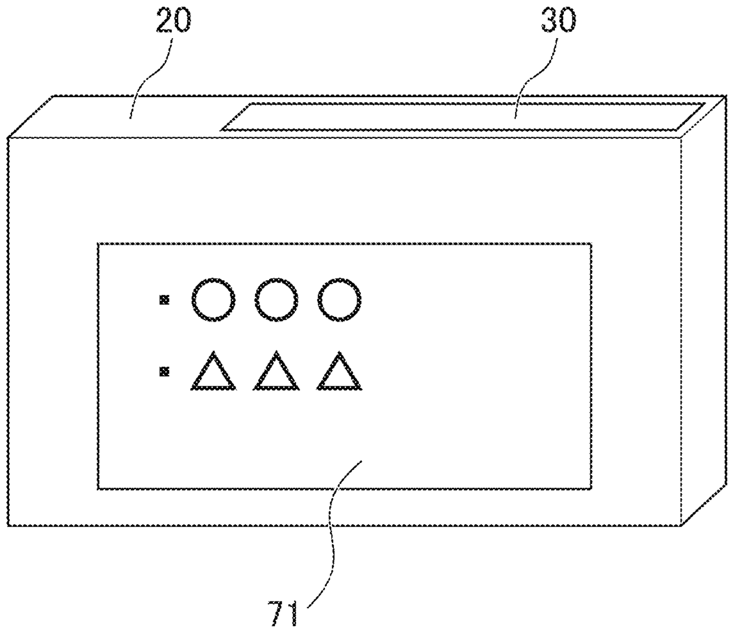
FIG. 11 is a perspective view of a bulk case to which a label is attached on a component manufacturer side.

In the present preferred embodiment, as shown in FIG. 11, a label 71 is attached to the bulk case 20 (step S110).

On the label 71, at least one piece of manufacturer-side information among the manufacturer-side information stored in the database server 44 and the manufacturer-side information storage area 60G of the cloud 60 in association with the unique ID 30X, or manufacturer-side information necessary for shipping is printed in advance.

The manufacturer side information printed on the label 71 can be visually confirmed.

The label 71 may include at least one of, for example, a one-dimensional barcode and a two-dimensional barcode associated with the manufacturer side information.

The unique ID 30X of the RFID tag 30 of each bulk case 20 is read by the RFID reader 43, and the bulk case 20 is inspected (step S111).

The plurality of bulk cases 20 that have been inspected are packaged in boxes and shipped to the manufacturer of assembled products S (step S112).

Figure 12:
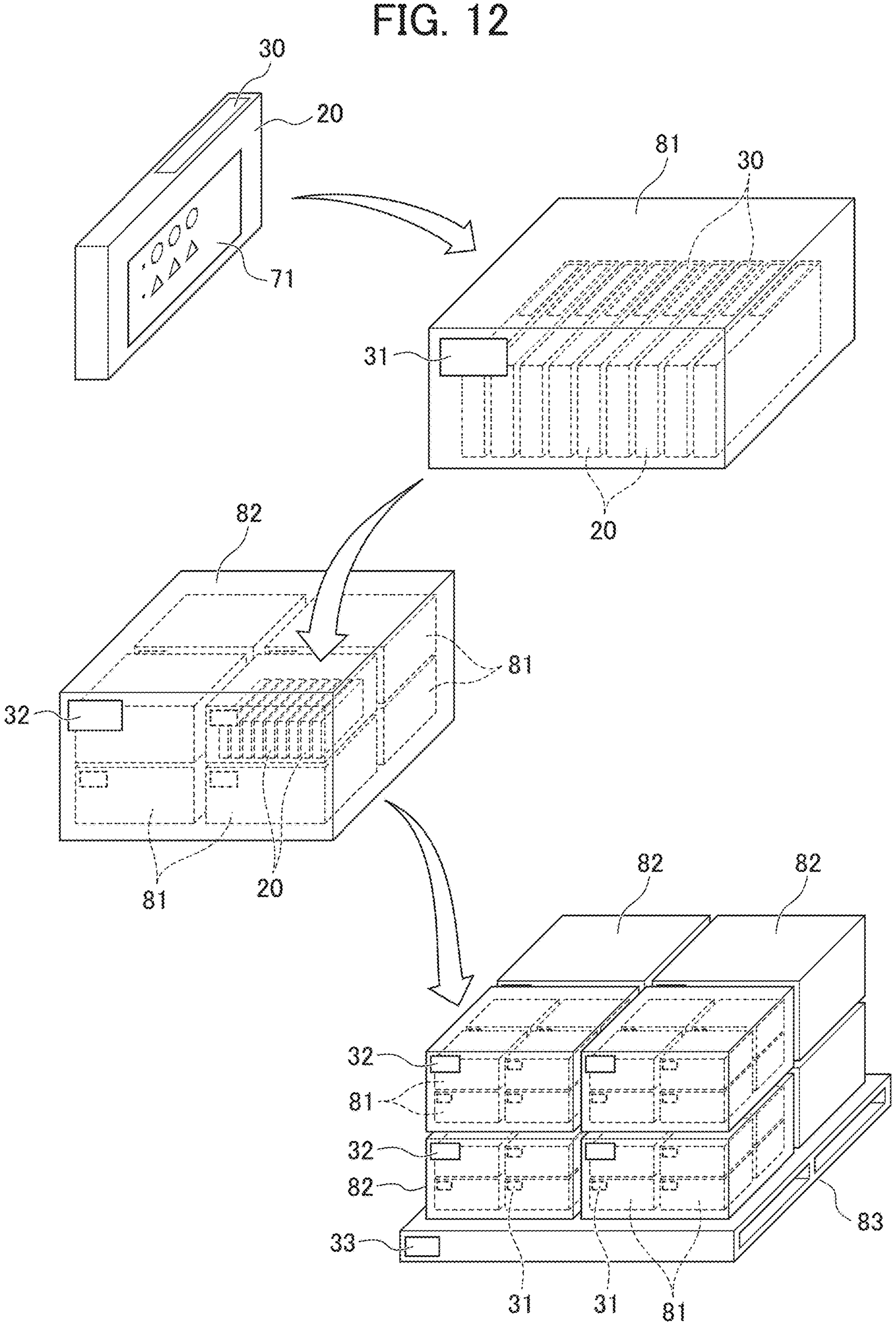
FIG. 12 is a perspective view of an example of a packing method of a plurality of bulk cases when the bulk cases are shipped.

For example, as shown in FIG. 12, a predetermined number of the bulk case 20 is stored in one exterior box 81, a plurality of exterior boxes 81 are stored in one transport outer box 82 in a two-stage stacked state, and a plurality of transport outer boxes 82 are stacked on a pallet 83.

The exterior box 81 may include the RFID tag 31 in which the unique ID 30X of the RFID tag 30 of each of the plurality of bulk cases 20 housed in the exterior box 81 is recorded.

Further, the transport outer box 82 may include the RFID tag 32 in which the RFID tags 31 of the plurality of exterior boxes 81 stored in the transport outer box 82 are recorded.

Further, the pallet 83 may include the RFID tag 33 in which the RFID tag 32 of each of the plurality of transport outer boxes 82 stacked on the pallet 83 are recorded.

In this case, the unique ID 30X included in the stored bulk case 20, the RFID tag 31, the RFID tag 32, and the RFID tag 33 are associated with each other, and stored in the database server 44 and the manufacturer-side information storage area 60G of the cloud 60.

Thus, the unique IDs 30X of the plurality of bulk cases 20 can be collectively read for each of the exterior box 81, the transport outer box 82, and the pallet 83.

Figure 13:
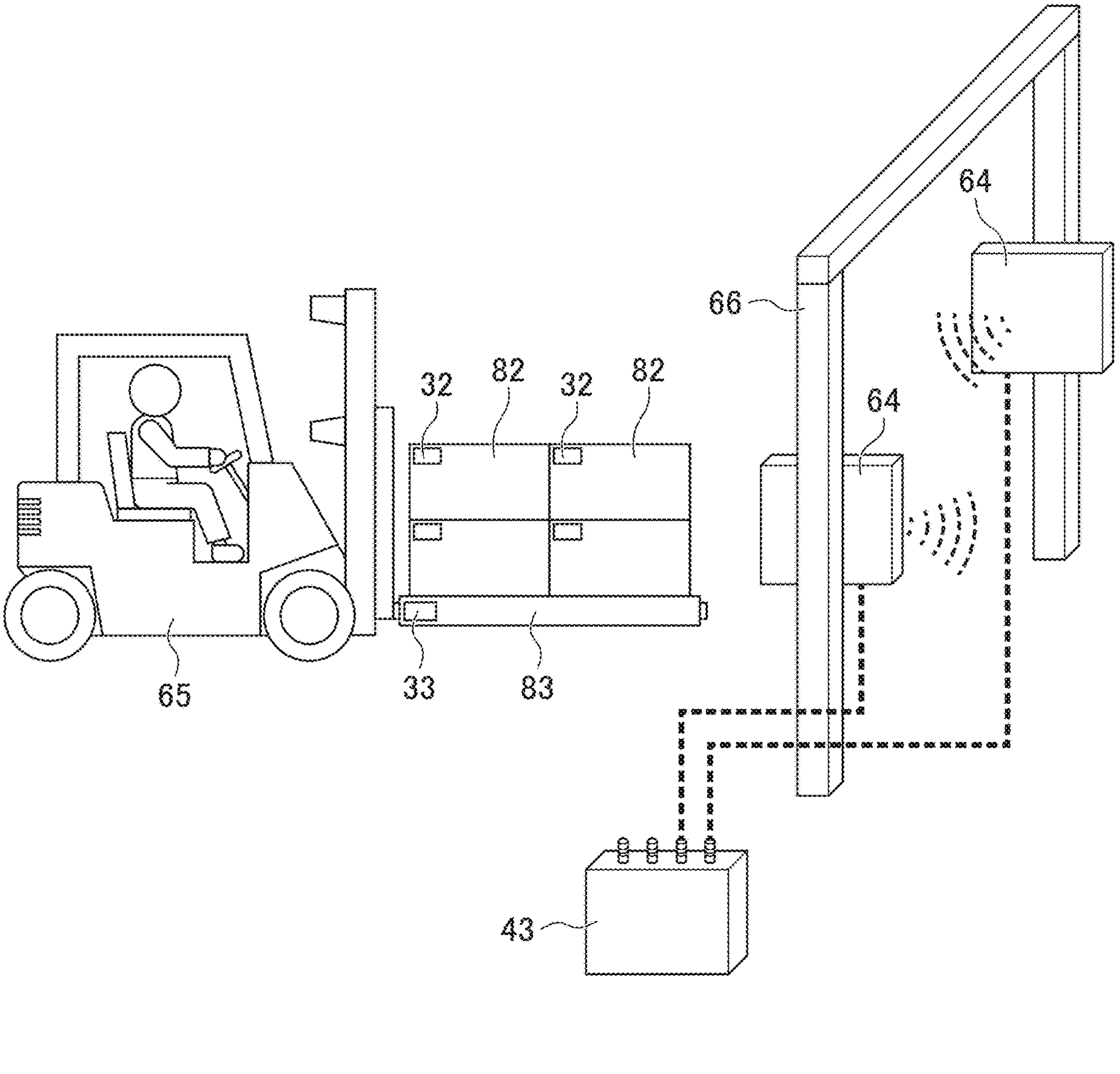
FIG. 13 is a perspective view of a case where an RFID tag is read during transportation of a plurality of bulk cases packaged at the time of shipment.

When a plurality of transport outer boxes 82 are stacked on the pallet 83 as described above, the pallet 83 is conveyed to a shipping location by a forklift 65 as shown in FIG. 13.

When the forklift 65 passes through the gate 66, the RFID reader 43 reads the RFID tag 31, the RFID tag 32, and the RFID tag 33 via the sensor 64 provided in the gate 66, thus making it possible to perform shipping management to confirm that a plurality of bulk cases 20 associated with the RFID tag 31, the RFID tag 32, and the RFID tag 33 have been shipped.

Figure 14:
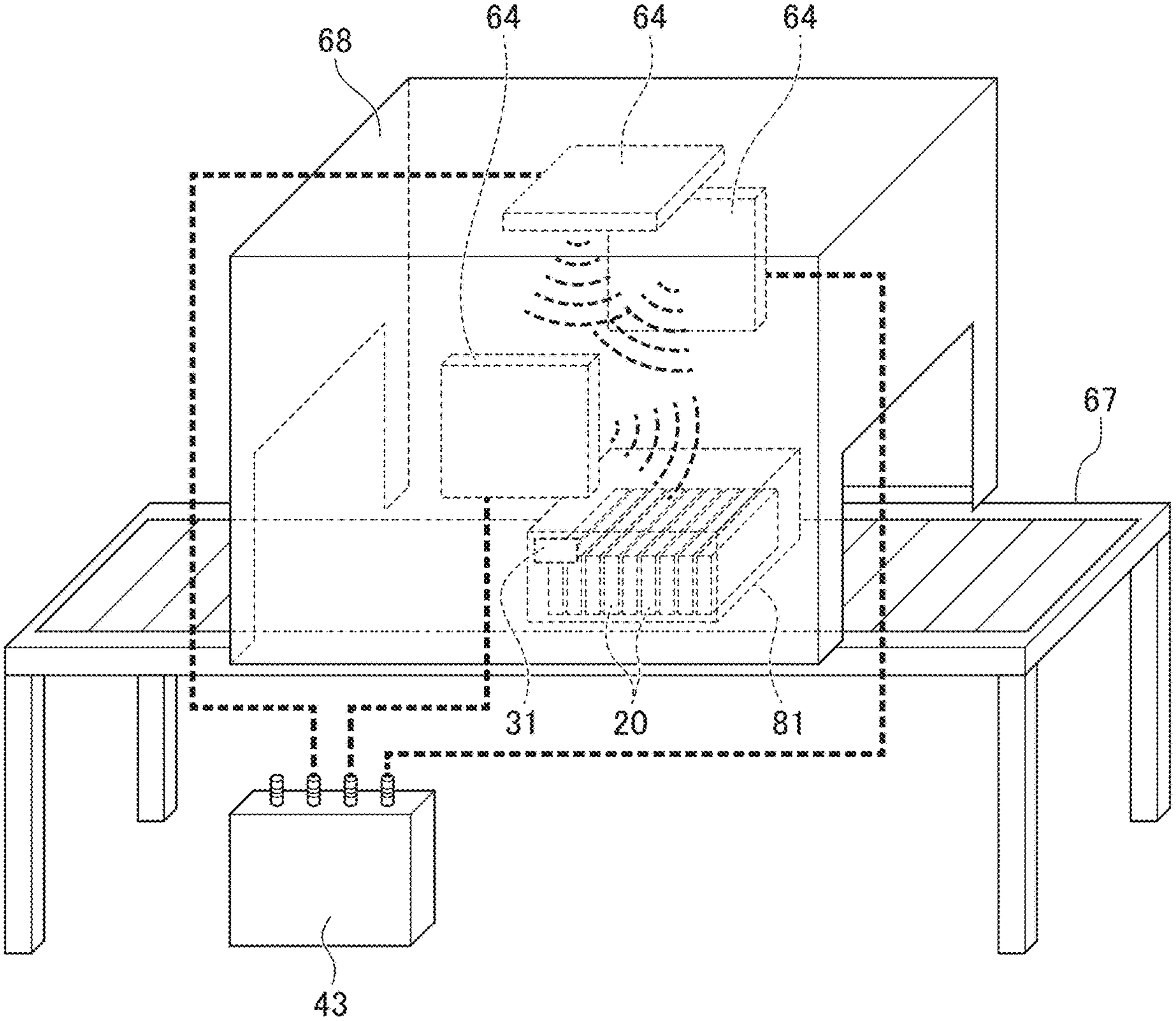
FIG. 14 is a perspective view of another method of reading an RFID tag at the time of shipment.

FIG. 14 shows another mode of reading the RFID tag 30 at the time of shipment.

In FIG. 14, the unique ID 30X of the RFID tag 30 is read by the RFID reader 43 via the sensor 64 provided in the gate 68 while the exterior box 81 that stores the bulk case 20 being conveyed by the conveying table 67 is conveyed in a tunnel-shaped gate 68.

The RFID reader 43 accessing the database server 44 reads the manufacturer information associated with the read unique ID 30X.

User-Side Steps in Manufacturer of Assembled Products S

Figure 8:
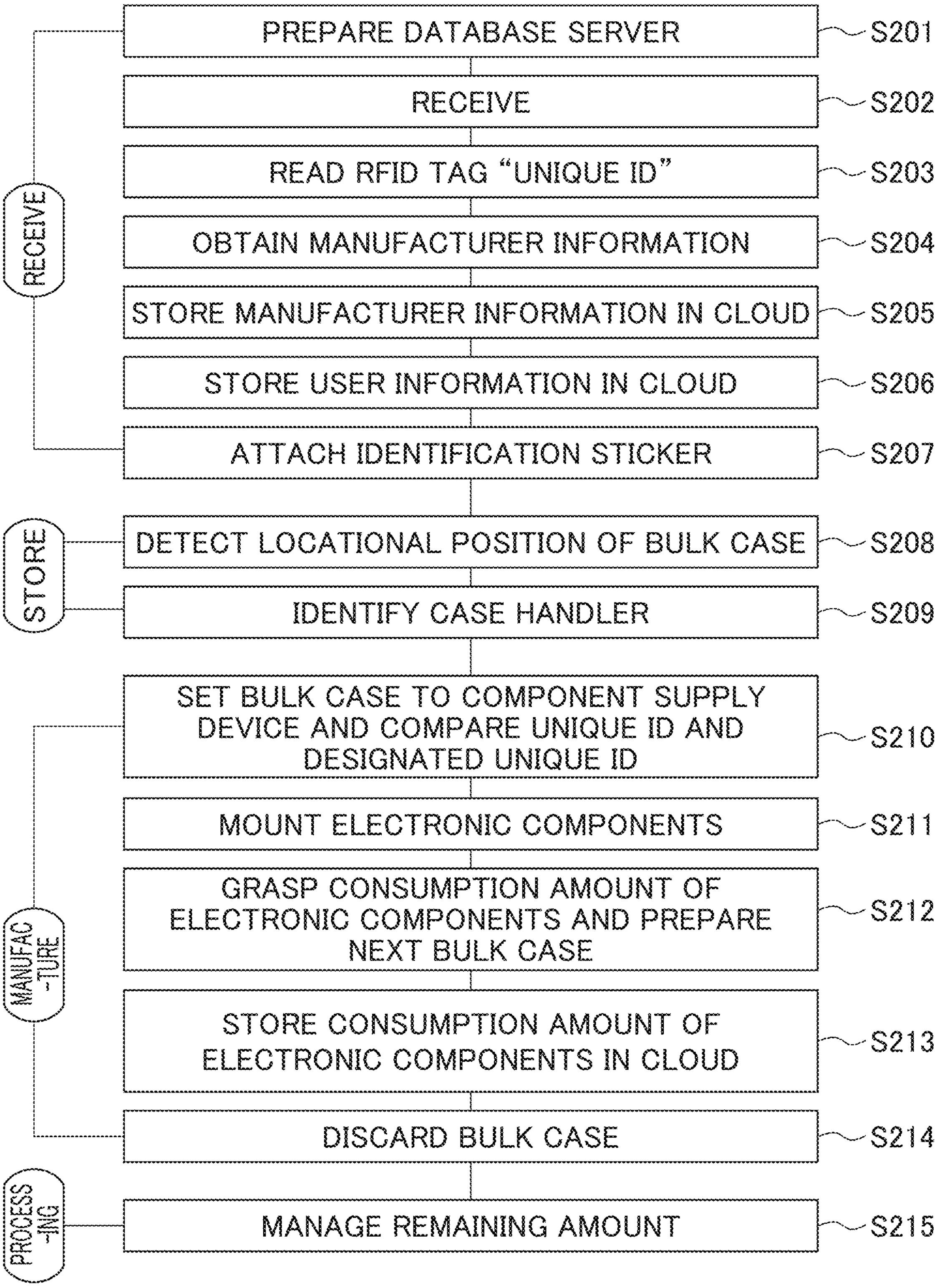
FIG. 8 is a flowchart of a method for managing electronic components according to a preferred embodiment of the present invention, and shows details of the user's steps on the manufacturer of assembled products side.

FIG. 8 shows the details of the manufacturer-side step S2, which is the flow of the electronic components 10 on the manufacturer of assembled products S side.

In the manufacturer of assembled products S, a database server 54 storing user-side information described later is prepared in advance (step S201).

Receiving Process

In the receiving process, first, a plurality of bulk cases 20 are received by the factory of the manufacturer of assembled products S (step S202).

In the receiving process, the RFID tag 30 of the received bulk case 20 is read by the predetermined RFID reader 53, and the unique ID 30X stored in the RFID tag 30 is read (step S203).

Thus, the manufacturer of assembled products S acquires the manufacturer-side information via the cloud 60 based on the read unique ID 30X (step S204).

The manufacturer-side information to be obtained includes the lot number of the electronic components 10, the number of the electronic components 10 stored in the bulk case 20, product information such as, for example, performance of the electronic components 10, environmental information about the electronic components 10, inspection number of the electronic components 10, and the like.

As shown in FIG. 12, when a plurality of bulk cases 20 are stored in the exterior box 81 or a plurality of exterior boxes 81 are stored in the transport outer box 82 and the electronic components 10 are received by the manufacturer of assembled products S, the RFID tag 31 included in the exterior box 81 and the RFID tag 32 included in the transport outer box 82 are read by the RFID reader 53.

Thus, the unique IDs 30X of the plurality of bulk cases 20 can be collectively read for each of the exterior box 81 and the transport outer box 82.

The manufacturer of assembled products S stores the manufacturer-side information obtained based on the unique ID 30X read from the RFID tag 30 of the received bulk case 20 in the user-side information storage area 60S of the cloud 60 (step S205).

In some cases, the manufacturer of assembled products S stores predetermined user-side information required by the manufacturer of assembled products S in the user-side information storage area 60S of the cloud 60 as additional information (step S206).

Figure 15:
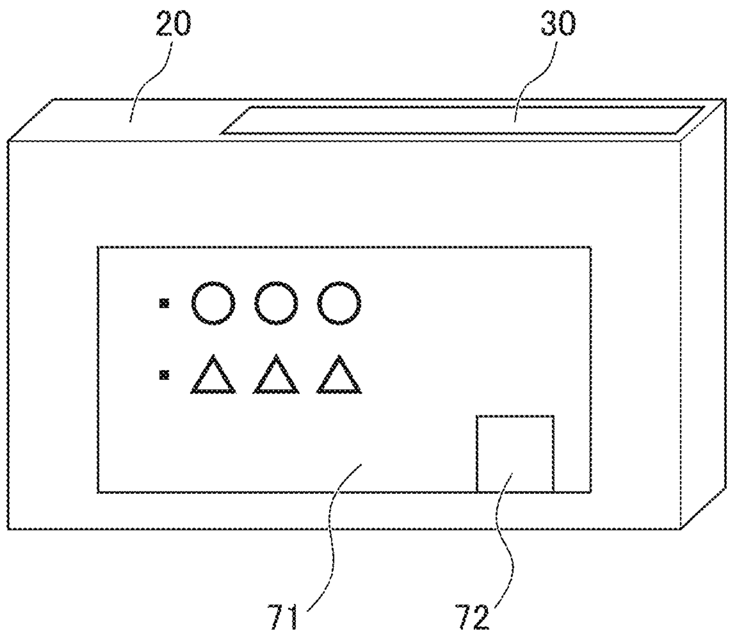
FIG. 15 is a perspective view of a bulk case in which an identification seal is attached to a label on the manufacturer of assembled products side.

In the present preferred embodiment, as shown in FIG. 15, a unique identification sticker 72 on the manufacturer of assembled products S side is attached to the bulk case 20 (step S207).

The identification sticker 72 is a sticker having, for example, one of single colors such as red, blue, and yellow, and may be attached to the label 71.

Depending on the color of the identification sticker 72, a differentiated procedure in the manufacturer of assembled products S is performed on the bulk case 20.

For example, a manufacturing line, a manufacturing order, and the like are selected for each color of the identification sticker 72.

Storage Process

When the bulk case 20 is stored in a predetermined storage location or is picked and transported from the storage location in the manufacturer of assembled products S before the manufacturing process, the manufacturer of assembled products S also reads the unique ID 30X of the RFID tag 30 by the predetermined RFID reader 53 to perform location management of the bulk case 20, i.e., management to detect a locational position (step S208).

In addition, similarly to the component manufacturer G, for example, the inventory information management, the security management, and the like of the bulk case 20 can be performed by reading the RFID tag 30.

Since the RFID tag 30 cannot be detected by the RFID reader 53 or the like when the RFID tag 30 is stored in the metal case, a metal detector and an X-ray inspection apparatus are used in combination.

Figure 16:
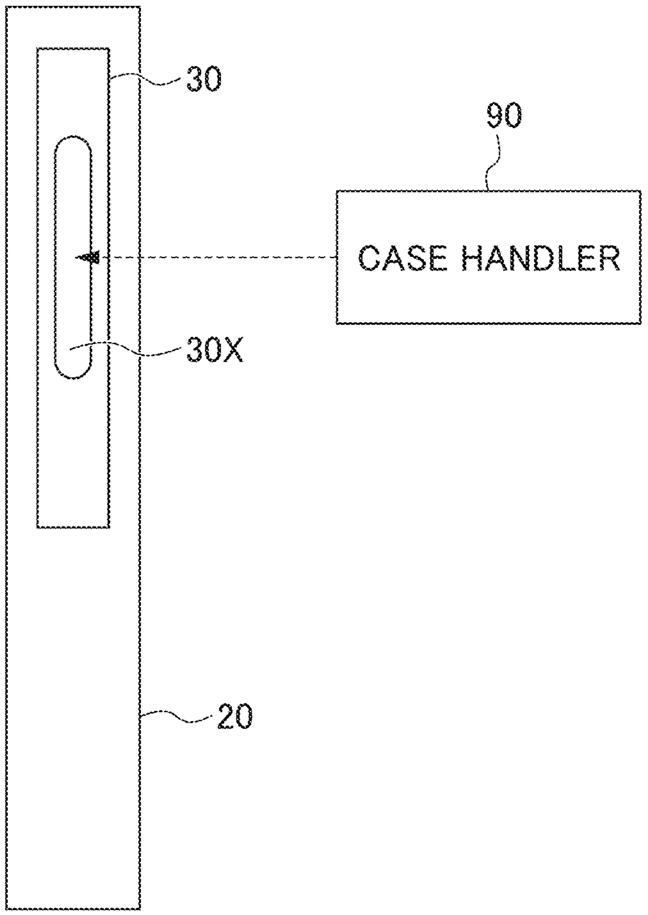
FIG. 16 is a schematic diagram of a case where a case handler reads a unique ID in the manufacturer of assembled products.

In the manufacturer of assembled products S, as shown in FIG. 16, a case handler 90 handling the bulk case 20 reads the unique ID 30X of the RFID tag 30, and identifies the case handler 90 as the handler of the bulk case 20 from the read unique ID 30X (step S209).

The case handler 90 is an example of a container handler, and examples thereof include an operator, a work robot, and a transport device such as, for example, an unmanned transport vehicle that transports the bulk case 20.

When the case handler 90 is an operator, the RFID tag 30 is read by a portable RFID reader.

When the case handler is a work robot or an unmanned transport vehicle, for example, the RFID tag 30 is read by an RFID reader mounted on the work robot or the unmanned transport vehicle.

Manufacturing Process

In the manufacturing process, the bulk case 20 is dispensed from the storage location toward the mounter 56, and the bulk case 20 is set in each of the plurality of component supply devices 57 included in the mounter 56.

In each component supply device 57, the unique ID 30X of the RFID tag 30 included in the bulk case 20 is read by the RFID reader 58, and the read unique ID 30X is compared with the designated unique ID 57X designated by the component supply device 57 itself (step S210).

As a result, it is confirmed whether or not the bulk case 20 is the bulk case 20 in which the electronic components 10 to be mounted by the component supply device 57 is stored, and mistaking of the electronic components 10 is prevented in advance.

For example, when the bulk case 20 that stores the electronic components 10 that is not compatible with the component supply device 57 is set, the component supply device 57 does not operate, the bulk case 20 is detached from the component supply device 57, and the next bulk case 20 is set.

The electronic components 10 are supplied one by one from the bulk case 20 set in the component supply device 57 to the mounter 56, such that the electronic components 10 are mounted on the electronic circuit board (step S211).

In each component supply device 57, based on the quantity information of the electronic components 10 stored in the bulk case 20 among the manufacturer-side information obtained in step S204, the consumption amount of the electronic components 10 arranged in the electronic circuit board and the remaining amount of the electronic components 10 in the bulk case 20 based on the consumption amount of the electronic components 10 are determined.

When the remaining amount of the electronic components 10 is lower than a predetermined amount, another bulk case 20 that has been received is prepared (step S212).

Further, the consumption amount of the electronic components 10 is associated with the unique ID 30X and stored in the database server 54, and further stored in the manufacturer-side information storage area 60G of the cloud 60 (step S213).

The component manufacturer G can quickly confirm the consumption of the electronic components 10 in the manufacturer of assembled products S by reading the unique ID 30X.

In addition, the consumption amount of the electronic components 10 in the manufacturer of assembled products S at this time may be transmitted to the component manufacturer G by an electronic transmitter, such as, for example, the Internet or a LAN, or a physical transmission device, such as, for example, storing the information in a recording medium such as a memory device or a CD-ROM and delivering it.

On the other hand, the consumption amount of the electronic components 10 is transmitted from the manufacturer of assembled products S to the component manufacturer G as described above.

In the component manufacturer G, the remaining amount of the electronic components 10 in the manufacturer of assembled products S is predicted based on the consumption amount of the electronic components 10 transmitted from the manufacturer of assembled products S.

When the remaining amount of the electronic components 10 is lower than a preset remaining amount, the component manufacturer G starts an operation of storing the electronic components 10 in the bulk case 20 and prepares for shipment.

When all of the electronic components 10 in the bulk case 20 are mounted in the manufacturer of assembled products S, the empty bulk case 20 is detached from the component supply device 57 and discarded (step S214).

The empty bulk case 20 may be returned to the component manufacturer G for reuse.

In the processing process after the manufacturing process, for example, the bulk case 20 in which the electronic components 10 remain are stored in a predetermined location as a midway inventory.

In this case, the RFID tag 30 of the bulk case 20 is read by the RFID reader 53, and the remaining amount is managed as the bulk case 20 in the middle inventory (step S215).

In addition, in the processing process, by reading the RFID tag 30 of the bulk case 20, it is possible to perform manufacturing trend management based on the type of the electronic components 10 to be used or the amount of the electronic devices set to be manufactured, security management of the bulk case 20, and the like.

The user side information in step S206 may be stored in the cloud 60, for example.

The user-side information stored in the cloud 60 may be accessible from the component manufacturer G side.

By making accessible from the component manufacturer G, the component manufacturer G can determine the specification mode and inventory information of the manufacturer of assembled products S, such that the request from the manufacturer of assembled products S can be predicted in advance, and the request from the manufacturer of assembled products S can be flexibly handled.

Data stored in the cloud 60 may be stored using block chain, for example.

The use of block chain makes it difficult to tamper with the data stored in the cloud 60, thus increasing the reliability of the data stored in the cloud 60.

Figure 17:
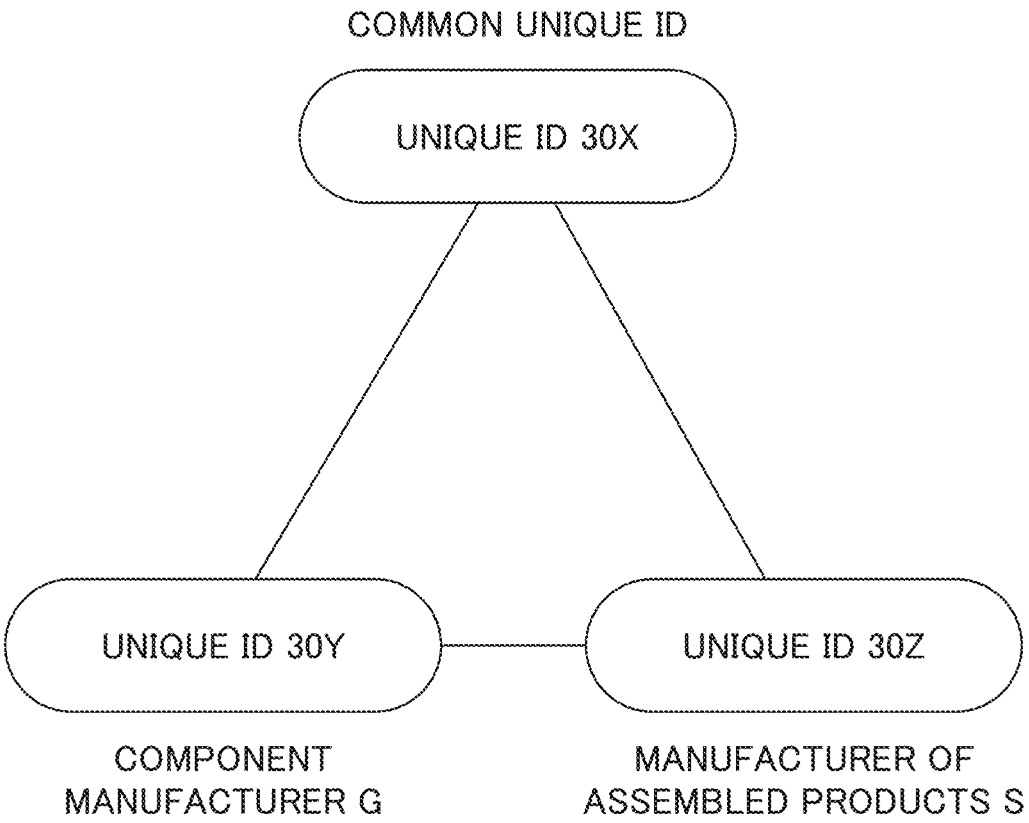
FIG. 17 is a diagram of an image in which unique IDs are used in each of the component manufacturer and the manufacturer of assembled products, and these unique IDs are associated with a common unique ID.

In the above preferred embodiment, the unique ID 30X written in the RFID tag 30 is common (common unique ID) between the component manufacturer G and the manufacturer of assembled products S, and one unique ID 30X is used consistently from the component manufacturer G to the manufacturer of assembled products S. However, as shown in FIG. 17, a unique ID 30Y, which is unique to the component manufacturer G, may be used on the component manufacturer G side while a unique ID 30Z, which is unique to the manufacturer of assembled products S, may be used on the manufacturer of assembled products S side.

In this case, the unique ID 30Y on the component manufacturer side and the unique ID 30Z on the manufacturer of assembled products side are associated with the common unique ID 30X such that various types of information written in the RFID tag 30 can be shared.

Further, one of the unique ID 30Y on the component manufacturer side and the unique ID 30Z on the manufacturer of assembled products side may be the same as the unique ID 30X, and one of the unique ID 30Y on the component manufacturer side and the unique ID 30Z on the manufacturer of assembled products side may be associated with the unique ID 30X.

According to the preferred embodiment described above, the following advantageous effects are achieved.

(1) A method for managing electronic components according to a preferred embodiment includes a manufacturer-side step performed in a manufacturer-side facility defining and functioning as the component manufacturer G, where a manufacturer manufactures the electronic components 10, and a user-side step performed in a user-side facility defining and functioning as the manufacturer of assembled product S, where a user uses the electronic components 10 manufactured in the component manufacturer G. The manufacturer-side step includes preparing a storage body defining and functioning as the bulk case 20 that stores a plurality of electronic components 10 and includes an RFID tag including a unique number defining and functioning as the unique ID 30X stored therein, storing manufacturer-side information in association with the unique ID 30X in the manufacturer-side information storage area 60G in the cloud 60, and shipping the bulk case 20 in which the plurality of electronic components 10 are stored. The user-side step includes receiving the bulk case 20 shipped, reading the unique ID 30X stored in the RFID tag 30, and obtaining the manufacturer-side information stored in the manufacturer-side information storage area 60G of the cloud 60 based on the unique ID 30X read.

With such a configuration, with respect to the bulk case 20 in which the plurality of electronic components 10 are stored, it is possible to achieve various management types on both the component manufacturer G side and the manufacturer of assembled products S side by using the unique ID 30X of the RFID tag 30 included in the bulk case 20.

Further, it is possible to use the unique ID 30X written in the RFID tag 30 to consistently manage the electronic components 10 from the component manufacturer G to the manufacturer of assembled products S.

(2) A method for managing electronic components according to a preferred embodiment includes a manufacturer-side step performed in a manufacturer-side facility defining and functioning as the component manufacturer G where a manufacturer manufactures the electronic components 10, and a user-side step performed in a user-side facility defining and functioning as the manufacturer of assembled products S where a user uses the electronic components 10 manufactured in the component manufacturer G. The manufacturer-side step includes preparing a storage body defining and functioning as the bulk case 20 that stores a plurality of electronic components 10 and includes an RFID tag 30, preparing a unique number defining and functioning as the unique ID 30X associated with manufacturer-side information, storing the manufacturer-side information in association with the unique ID 30X in the manufacturer-side information storage area 60G in the cloud 60, writing the unique ID 30X in the RFID tag 30, and shipping the bulk case 20 in which the plurality of electronic components 10 are stored. The user-side step includes receiving the bulk case 20 shipped, reading the unique ID 30X stored in the RFID tag 30, and obtaining the manufacturer-side information stored in the manufacturer-side information storage area 60G of the cloud 60 based on the unique ID 30X read.

With such a configuration, with respect to the bulk case 20 in which the plurality of electronic components 10 are stored, it is possible to achieve various management types on both the component manufacturer G side and the manufacturer of assembled products S side by using the unique ID 30X of the RFID tag 30 included in the bulk case 20.

Further, it is possible to use the RFID tag 30 to manage the components consistently from the component manufacturer G to the manufacturer of assembled products S.

(3) In a method for managing electronic components according to a preferred embodiment, the manufacturer-side step further includes reading the manufacturer-side information based on the unique ID 30X, creating a label 71 based on the manufacturer-side information read, and attaching the label 71 to the bulk case 20.

With such a configuration, it is possible to visually confirm the manufacturer-side information by looking at the label 71, and it is possible to promptly advance management based on the manufacturer-side information without requiring a reading device such as the RFID reader.

(4) In a method for managing electronic components according to a preferred embodiment, the manufacturer-side step further includes collectively reading unique IDs 30X from the RFID tags 30 of the bulk cases 20 when performing the shipping the bulk case 20 in which the plurality of electronic components 10 are stored.

With such a configuration, in the component manufacturer G, it is possible to omit the operation of reading the RFID tags 30 of the bulk case 20 one by one, and it is possible to improve the efficiency of management.

(5) In a method for managing electronic components according to a preferred embodiment, the user-side step further includes collectively reading unique IDs 30X from the RFID tags 30 of the plurality of bulk cases 20 when performing the step of receiving the bulk cases 20 shipped.

With such a configuration, in the manufacturer of assembled products S, it is possible to omit the operation of reading the RFID tags 30 of the bulk case 20 one by one, and it is possible to improve the management efficiency.

(6) In a method for managing electronic components according to a preferred embodiment, the user-side step further includes a user causing a first reader defining and functioning as the RFID reader 53 provided at a predetermined location in the manufacturer of assembled products S to read the RFID tag 30 and detect a locational position of the bulk case 20.

With such a configuration, it is possible to always determine the locational position of the bulk case 20, and it is possible to perform various managements such as inventory information management, location management, and security management.

(7) In a method for managing electronic components according to a preferred embodiment, the user-side step further includes identifying a case body handler by the RFID tag 30 being read by the case body handler defining and functioning as the storage body handler positioned at a predetermined location in the manufacturer of assembled products S.

With such a configuration, it is possible for the manufacturer of assembled products S to always identify an operator, a transport vehicle, or the like that deals with the bulk case 20, and to perform management such as accurately grasping the current locational position of the bulk case 20.

(8) In a method for managing electronic components according to a preferred embodiment, the user-side step further includes a mounting device defining and functioning as the component supply device 57 arranging each of the plurality of electronic components 10 stored in the bulk case 20 on an electronic circuit board, and the component supply device 57 stores a designated unique number functioning as the designated unique ID 57X, includes a second reader defining and functioning as the RFID reader 58 that reads the RFID tag, and is configured to compare the unique ID 30X stored in the RFID tag 30 read by the RFID reader 58 with the designated unique ID 57X designated by the component supply device 57.

With such a configuration, it is confirmed whether or not the unique ID 30X of the bulk case 20 is the bulk case 20 in which the electronic components 10 to be mounted by the component supply device 57 is stored, and as a result, it is possible to prevent the electronic components 10 from being mistaken.

(9) In a method for managing electronic components according to a preferred embodiment, the manufacturer-side step further includes storing quantity information of the electronic components 10 stored in the bulk case 20, as the manufacturer-side information, in a manufacturer-side information storage area 60G in the cloud 60, and the user-side step further includes determining the consumption amount of the electronic components 10 arranged on the electronic circuit board by the component supply device 57 based on the quantity information obtained based on the unique ID 30X, and preparing another received bulk case 20 based on the consumption amount.

With such a configuration, in the manufacturer of assembled products S, it is possible to perform a replacement operation of replacing the bulk case 20 having completed the supply of the electronic components 10 to the component supply device 57 with a new bulk case 20 quickly after the completion of the supply of the electronic components 10, and it is possible to perform the mounting of the electronic components 10 continuously even when the bulk case 20 is replaced.

As a result, it is possible to improve productivity.

(10) In a method for managing electronic components according to a preferred embodiment, the consumption amount of the electronic components is associated with the unique ID 30X, and the unique ID 30X is stored in a user-side information storage area 60S in the cloud 60 and transmitted to the manufacturer.

With such a configuration, on the component manufacturer G side, it is possible to accurately prepare the process of storing the electronic components 10 in the bulk case 20 based on the consumption amount of the electronic components 10 in the manufacturer of assembled products S.

(11) In a method for managing electronic components according to a preferred embodiment, the manufacturer stores the electronic components 10 in the bulk case 20 based on the consumption amount of the electronic components 10 transmitted from the user.

With such a configuration, it is possible for the component manufacturer G to perform the step of efficiently storing the electronic components 10 in the bulk case 20 based on the consumption of the electronic components 10 on the manufacturer of assembled products S side.

(12) In a method for managing electronic components according to a preferred embodiment, the unique ID 30Y on the component manufacturer G side is used as the unique ID in the component manufacturer G, the unique ID 30Z on the manufacturer of assembled products S is used as the unique ID in the manufacturer of assembled product S, and either one of the unique ID 30Y on the component manufacturer G side or the unique ID 30Z on the manufacturer of assembled products S side is same as the unique ID 30X, and either one of the unique ID 30Y on the component manufacturer G side or the unique ID 30Z on the manufacturer of assembled products S side is associated with the unique ID 30X.

(13) In a method for managing electronic components according to a preferred embodiment, the unique ID 30Y on the component manufacturer G side is used as the unique ID in the component manufacturer G, the unique ID 30Z on the manufacturer of assembled products S side is used as the unique ID in the manufacturer of assembled products S, and the unique ID 30Y on the component manufacturer G side and the unique ID 30Z on the manufacturer of assembled products S side are associated with the unique ID 30X.

With such a configuration, it is possible for the component manufacturer G and the manufacturer of assembled products S or either one of the component manufacturer G and the manufacturer of assembled products S to use its own unique ID (unique ID 30Y and unique ID 30Z), such that it is possible to operate the conventional unique ID attaching method, pattern, and the like without changing by each manufacturer.

Although preferred embodiments of the present invention have been described above, the present invention is not limited to the above-described preferred embodiments, and modifications, improvements, and the like are included in the present invention as long as the advantageous effects of the present invention can be achieved.

For example, in the component manufacturer G, the database server 44 may be omitted, and the unique ID 30X and the manufacturer-side information may be directly stored in the manufacturer side information storage area 60G of the cloud 60.

The same applies to the manufacturer of assembled products S, and the database server 54 may be omitted, and the unique ID 30X and the user side information may be directly stored in the user side information storage area 60S of the cloud 60.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for managing electronic components, the method comprising:

a manufacturer-side process performed in a manufacturer-side facility where a manufacturer manufactures the electronic components; and a user-side process performed in a user-side facility where a user uses the electronic components manufactured in the manufacturer-side facility; wherein the manufacturer-side process includes:

preparing a storage body that stores a plurality of electronic components and includes an RFID tag including a unique number stored therein;

storing manufacturer-side information in association with the unique number in a manufacturer-side information storage area in an external storage device; and shipping the storage body in which the plurality of electronic components are stored;

the manufacturer-side process further includes storing quantity information of the plurality of electronic components stored in the storage body, as the manufacturer-side information, in the manufacturer-side information storage area in the external storage device;

the user-side process includes:

receiving the shipped storage body;

reading the unique number stored in the RFID tag; and obtaining the manufacturer-side information stored in the manufacturer-side information storage area of the external storage device based on the unique number read;

the user-side process further includes a mounting device arranging each of the plurality of electronic components stored in the storage body on an electronic circuit board;

the mounting device stores a designated unique number, includes a second reader that reads the RFID tag, and is configured to compare a unique number stored in the RFID tag read by the second reader with the designated unique number designated by the mounting device;

the user-side process further includes determining a consumption amount of the electronic components arranged on the electronic circuit board by the mounting device based on the quantity information obtained based on the unique number, and preparing another received storage body based on the consumption amount; and the consumption amount of the electronic components is associated with the unique number, and the unique number is stored in a user-side information storage area in the external storage device and transmitted to the manufacturer.

2. The method for managing electronic components according to claim 1, wherein the manufacturer-side process further includes reading the manufacturer-side information based on the unique number, creating a label based on the manufacturer-side information read, and attaching the label to the storage body.

3. The method for managing electronic components according to claim 1, wherein the manufacturer-side process further includes collectively reading unique numbers from RFID tags of a plurality of the storage bodies when performing the step of shipping the storage body in which the plurality of electronic components are stored.

4. The method for managing electronic components according to claim 1, wherein the user-side process further includes collectively reading unique numbers from RFID tags of a plurality of the storage bodies when performing the step of receiving the shipped storage body.

5. The method for managing electronic components according to claim 1, wherein the user-side process further includes a user causing a first reader at a predetermined location in the user-side facility to read the RFID tag and detect a position of the storage body.

6. The method for managing electronic components according to claim 1, wherein the user-side process further includes identifying a storage body handler by the RFID tag being read by the storage body handler positioned at a predetermined location in the user-side facility.

7. The method for managing electronic components according to claim 1, wherein the manufacturer stores the electronic components in the storage body based on the consumption amount of the electronic components transmitted from the user.

8. The method for managing electronic components according to claim 1, wherein a manufacturer-side unique number is used as the unique number in the manufacturer-side facility;

a user-side unique number is used as the unique number in the user-side facility; and either one of the manufacturer-side unique number or the user-side unique number is same as the unique number, and either one of the manufacturer-side unique number or the user-side unique number is associated with the unique number.

9. The method for managing electronic components according to claim 1, wherein a manufacturer-side unique number is used as the unique number in the manufacturer-side facility;

a user-side unique number is used as the unique number in the user-side facility; and the manufacturer-side unique number and the user-side unique number are associated with the unique number.

10. A method for managing electronic components comprising:

a manufacturer-side process performed in a manufacturer-side facility where a manufacturer manufactures the electronic components; and a user-side process performed in a user-side facility where a user uses the electronic components manufactured in the manufacturer-side facility; wherein the manufacturer-side process includes:

preparing a storage body that stores a plurality of electronic components and includes an RFID tag;

preparing a unique number associated with manufacturer-side information;

storing the manufacturer-side information in association with the unique number in a manufacturer-side information storage area in an external storage device;

writing the unique number in the RFID tag; and shipping the storage body in which the plurality of electronic components are stored;

the manufacturer-side process further includes storing quantity information of the plurality of electronic components stored in the storage body, as the manufacturer-side information, in the manufacturer-side information storage area in the external storage device;

the user-side process includes:

receiving the shipped storage body;

reading the unique number stored in the RFID tag; and obtaining the manufacturer-side information stored in the manufacturer-side information storage area of the external storage device based on the unique number read;

the user-side process further includes a mounting device arranging each of the plurality of electronic components stored in the storage body on an electronic circuit board;

the mounting device stores a designated unique number, includes a second reader that reads the RFID tag, and is configured to compare a unique number stored in the RFID tag read by the second reader with the designated unique number designated by the mounting device;

the user-side process further includes determining a consumption amount of the electronic components arranged on the electronic circuit board by the mounting device based on the quantity information obtained based on the unique number, and preparing another received storage body based on the consumption amount; and the consumption amount of the electronic components is associated with the unique number, and the unique number is stored in a user-side information storage area in the external storage device and transmitted to the manufacturer.

11. The method for managing electronic components according to claim 10, wherein the manufacturer-side process further includes reading the manufacturer-side information based on the unique number, creating a label based on the manufacturer-side information read, and attaching the label to the storage body.

12. The method for managing electronic components according to claim 10, wherein the manufacturer-side process further includes collectively reading unique numbers from RFID tags of a plurality of the storage bodies when performing the step of shipping the storage body in which the plurality of electronic components are stored.

13. The method for managing electronic components according to claim 10, wherein the user-side process further includes collectively reading unique numbers from RFID tags of a plurality of the storage bodies when performing the step of receiving the shipped storage body.

14. The method for managing electronic components according to claim 10, wherein the user-side process further includes a user causing a first reader provided at a predetermined location in the user-side facility to read the RFID tag and detect a locational position of the storage body.

15. The method for managing electronic components according to claim 10, wherein the user-side process further includes identifying a storage body handler by the RFID tag being read by the storage body handler at a predetermined location in the user-side facility.

16. The method for managing electronic components according to claim 10, wherein the manufacturer stores the electronic components in the storage body based on the consumption amount of the electronic components transmitted from the user.

17. The method for managing electronic components according to claim 10, wherein a manufacturer-side unique number is used as the unique number in the manufacturer-side facility;

a user-side unique number is used as the unique number in the user-side facility; and either one of the manufacturer-side unique number or the user-side unique number is same as the unique number, and either one of the manufacturer-side unique number or the user-side unique number is associated with the unique number.

18. The method for managing electronic components according to claim 10, wherein a manufacturer-side unique number is used as the unique number in the manufacturer-side facility;

a user-side unique number is used as the unique number in the user-side facility; and the manufacturer-side unique number and the user-side unique number are associated with the unique number.

* * * * *